Nov. 3, 1964   J. O. BLACK   3,155,343
CONVERTIBLE AIRCRAFT STRUCTURE
Filed Jan. 18, 1962   2 Sheets-Sheet 1
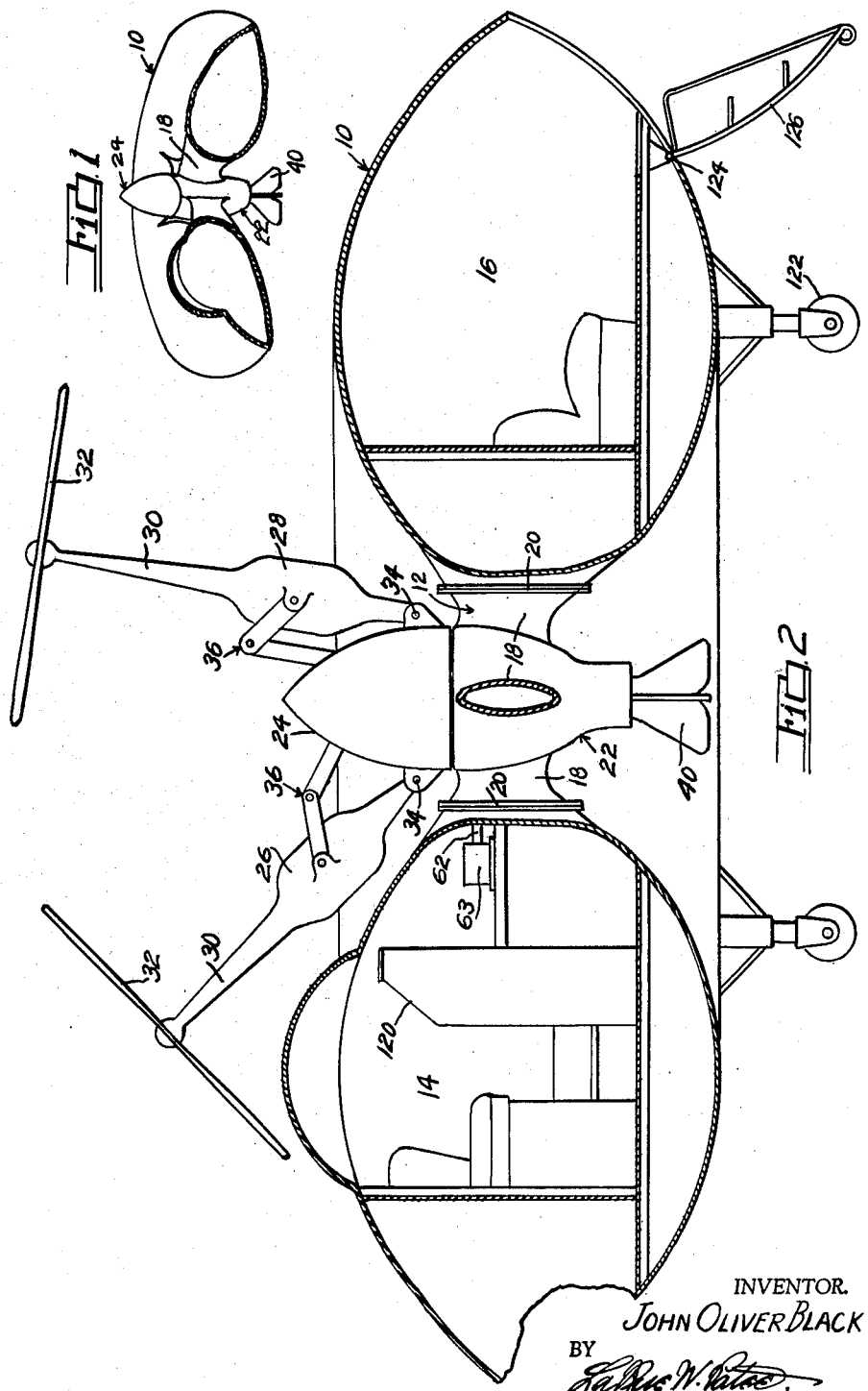
INVENTOR.
JOHN OLIVER BLACK
BY
ATTORNEY Nov. 3, 1964 J. O. BLACK 3,155,343
CONVERTIBLE AIRCRAFT STRUCTURE
Filed Jan. 18, 1962 2 Sheets-Sheet 2
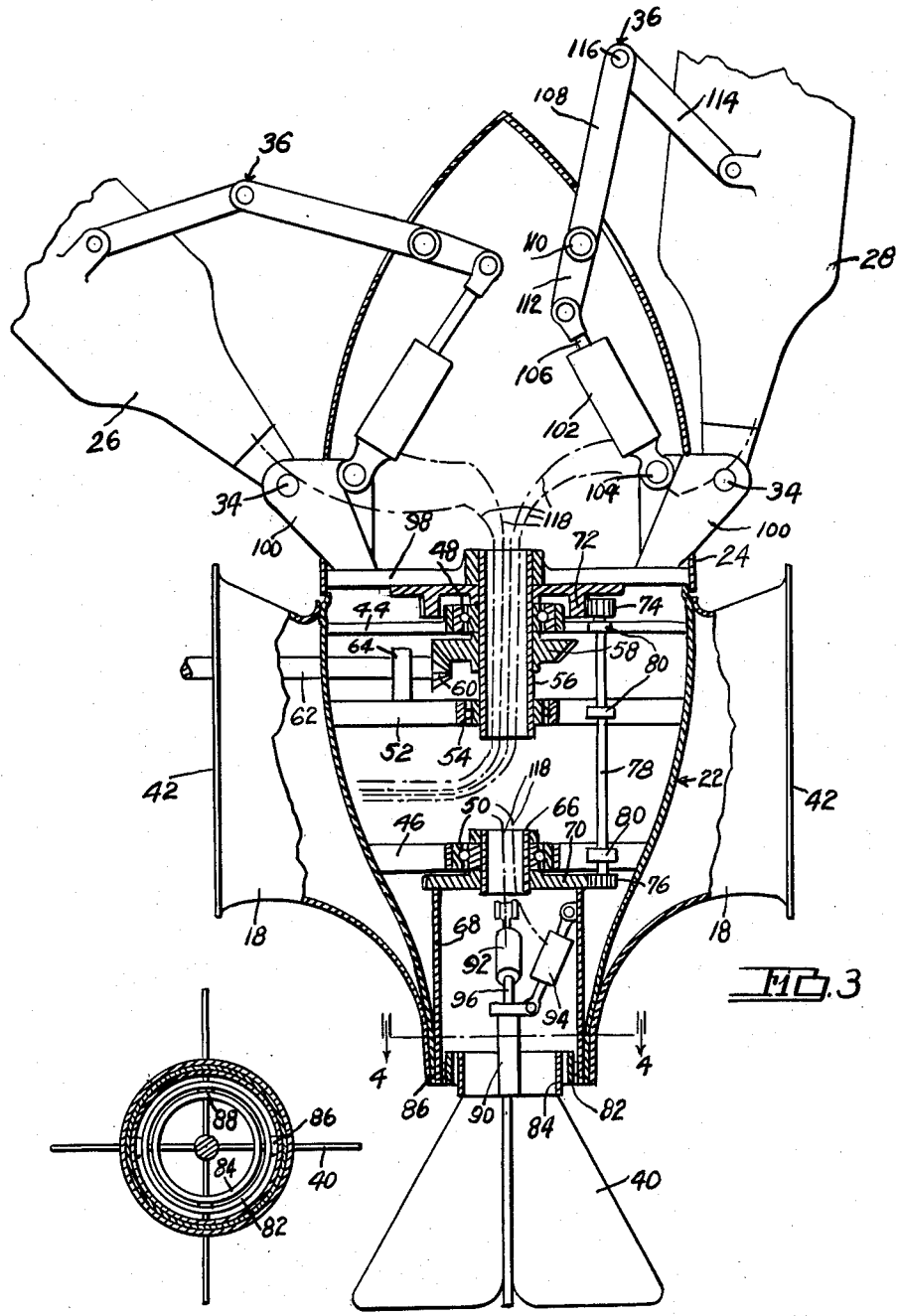
INVENTOR.
JOHN OLIVER BLACK
BY
ATTORNEY United States Patent Office 3,155,343
Patented Nov. 3, 1964

3,155,343
CONVERTIBLE AIRCRAFT STRUCTURE
John Oliver Black, 18094 Parkside, Detroit, Mich.
Filed Jan. 18, 1962, Ser. No. 167,052
4 Claims. (Cl. 244—17.21)

This invention relates to aircraft, and more particularly to an aircraft of a convertible type for use as a helicopter for vertical lift or for horizontal flight and one in which the direction of flight is controlled by independently movable propellers.

It is an object of the present invention to provide a saucer shaped fuselage, more specifically defined as being doughnut shaped having a central opening therethrough, and to suspend an annular shell having diminishing diameters at its opposite ends within the central opening and having its outer wall spaced inwardly from the inner periphery of the central opening providing a venturi passage between the annular shell and the fuselage.

Another object of the invention is to mount dual nacelles on an upper rotatable portion of the annular shell, each nacelle including the engine power driving means and a propeller.

A further object of the invention is to pivotally support each nacelle at one end on the annular shell so that its longitudinal axis may be moved relative to the longitudinal axis of the annular shell, but at all times maintaining an intersection of the nacelle axis with the axis of the annular shell.

A still further object of the invention is to provide gimbal supported fins at the lower end of the annular shell which are rotated about the axis of the annular shell in unison with the rotatable upper portion of the shell, and to provide means for tilting the longitudinal axis of the fins relative to the axis of the annular shell.

Other objects and advantages of the invention will more fully appear from the following description taken in connection with the accompanying drawings in which:

FIG. 1 is a perspective view of the airplane, a portion being broken away and in section;

FIG. 2 is a transverse sectional view, shown in larger scale, of the airplane, some parts being shown in elevation;

FIG. 3 is a longitudinal sectional view through the annular shell insert on a further enlarged scale, some parts being shown in elevation; and FIG. 4 is a cross sectional view taken on line 4—4 of FIG. 3 showing the gimbals support for the tail fins.

Referring to the drawings, the airplane has a fuselage 10 which is shaped similar to doughnut having an opening 12 through its center. The fuselage 10 is formed from framework and an outer skin providing a pilot's compartment 14 and a passenger or load carrying compartment 16 encircling the interior of the fuselage. Radial fins 18 detachably secured at 20 to the inner periphery of the opening 12 support an annular shell 22 having its outer wall spaced from the inner periphery of the opening 12. The shell 22 supports a rotatable nose portion 24 which is frustro conical in shape and which carries two oppositely disposed nacelles 26 and 28, each including an engine, power driven shaft housing 30 and a propeller 32. Each nacelle is pivotally supported at its inner end to the rotatable nose 24 as at 34. The nacelles are moved about the pivot point 34 by toggle links 36 connected to the nacelles and to operating mechanism within the nose 24. The shell 22 is frusto-conical in shape with its smaller end facing downwardly supporting outwardly projecting fins 40 which are rotatably mounted in the lower end of the shell 22, and which are angularly moved relative to the axis of the nose 24 and shell 22.

Referring now to FIG. 3 wherein the control mechanism is more clearly shown and described, the shell 22 is inserted into the opening 12 with the flanges 42 on the fins 18 secured to mating flanges on the fuselage 10. Transversely extending supports 44 and 46 are secured to the inner periphery of the shell 22 adjacent its opposite ends forming supports for bearings 48 and 50. An intermediate transverse support 52 is secured to the inner periphery of the shell 22 and is provided with a bearing 54. A sleeve 56 is rotatably mounted in the bearings 48 and 54. A bevel gear 58 is secured to the outer periphery of the sleeve 56 and meshes with another bevel gear 60 having a drive shaft 62 extending into the pilot's compartment 14 where the pilot may rotate the drive shaft 62 and gears 58 and 60. A bearing 64 supports the gear end of the shaft 62 and a motor 63 rotates the drive shaft 62. A sleeve 66 is rotatably supported in the bearing 50 and carries a larger sleeve 68. An externally toothed ring gear 70 is secured to the sleeve 66 and an externally toothed ring gear 72 is secured to the sleeve 56. Spur gears 74 and 76, meshing respectively with ring gears 72 and 70, are carried by a vertical shaft 78 journaled in bearings 80 on the transverse supports 44, 52 and 46. The gears 72 and 70 are of the same diameter and gears 74 and 76 are of the same diameter so that the sleeves 56 and 66 are rotated in unison and in the same direction when the gears 58 and 60 are rotated.

The sleeve 68 has its outer end journaled in the lower end of the shell 22 and is provided with a gimbals contrivance consisting of pivoted rings 82 and 84. The one ring 82 is pivotally supported by pins 86 to the sleeve 68 and the ring 84 is pivotally supported by pins 88 to the ring 82. The ring 84 carries a plurality of outwardly projecting fins 40, here shown as four, and may be defined as rudders. The plane of the fins extends radially with respect to the axis of the sleeve 68 and taper in width increasingly outwardly beyond the lower diameter of the shell 22. The fins 40 are attached to an axially and upwardly extending bar 90. The upper end of the bar 90 is moved angularly about the pivots 86 or 88 by a pair of cylinders 92 and 94 which are pneumatically or hydraulically controlled. The piston rods 96 are connected to the bar 90 and the cylinders are supported on the inner periphery of the sleeve 68. The cylinder 92 moves the vanes 40 about the pivots 86 and the cylinder 94 moves the vanes 40 about the pivots 88.

The nose portion 24 is rotatably supported on the shell 22. A plate 98 is fixed to the skin of the nose 24 and to the sleeve 56 so that rotation of the gear 58 causes rotation of the nose 24 about the vertical axis of the shell 22. Oppositely disposed brackets 100 are supported on the plate 98 and project through the sink of the nose 24. Nacelles 26 and 28 are pivotally supported at 34 to the brackets 100 for moving the longitudinal axis of each nacelle relative to the vertical axis of the nose 24 and shell 22. The longitudinal axes of the nacelles intersect the vertical axis of the nose 24 and shell 22.

The operating mechanism for moving the axes of the nacelles relative to the vertical axis of the nose 24 and shell 22 includes a cylinder 102, pivotally supported at 104 to the bracket 100, and a piston rod 106 which is pivotally attached to one end of the toggle link 36. The link arm 108 is pivotally attached to the nose portion 24 at 110 and has an extension 112 secured to the piston rod 106. The outer end of the link arm 108 is pivotally secured to a link 114 at 116 and its opposite end to the nacelle 28. When a pneumatic or hydraulic pressure is applied to the cylinder 102 the piston rod moves outwardly swinging the link 108 downwardly causing the link 114 to swing the axis of the nacelle about the pivot support 34. The nacelle 26 is operated in the same manner.

The controls for the several moving parts have been diagrammatically indicated by the dot and dash lines 118 extending from the actuated parts through the sleeves 56 and 66 to a control panel 120 in the pilot's compartment. Retractable landing wheels 122 may be provided and a portion of the fuselage 10 is pivotally mounted as at 124 forming a door 126 which permits ingress and egress to the circular passenger or load carrying compartment 16.

When it is desired to make a vertical take off, the nacelles 26 and 28 are tilted to a nearly vertical position. In this position the propellers act as helicopters which have a lift force to raise the airplane in a vertical direction. The propellers rotate in opposite direction to cancel out gyroscopic action to the lift. The air stream flows through the central opening 12 between the fuselage 10 and the central nose portion 24 and annular shell 22. After sufficient vertical lift of the airplane has been obtained, one or both of the nacelles may be tilted toward a horizontal axis for horizontal flight. The direction of horizontal flight may be determined by rotating the nose portion 24 and nacelles about the axis of the annular shell 22 and fuselage 10. When landing, the nacelles and propellers are returned to a vertical position.

If desired both propellers may be rotated by a single power plant located in the nose portion 24 as a substitute for the two nacelles 26 and 28 and the propellers independently driven by power shafts pivoted to the outer surface of the nose portion 24 in the same manner as disclosed in FIG. 3.

As shown and described it is apparent that I have provided an airplane which may be flown as a helicopter and easily converted to forward flight in any direction by positioning the axes of rotation relative to the axis of the fuselage.

While I have shown and described a preferred embodiment of the invention, it will be understood that various changes including the size, shape and arrangement of parts may be made without departing from the spirit of the invention and it is my intention to cover by the appended claims such changes as may be reasonably included within a reasonable interpretation of the meaning of the terms therein.

I claim:

1. An aircraft comprising a circular fuselage having a central circular opening therethrough, a central annular nose portion supported within the central opening and having its outer periphery spaced from the inner periphery of the central opening in said fuselage, a pair of oppositely disposed propellers having their axes of rotation intersecting the axis of said nose portion, power driven means for independently rotating said propellers, and means for independently tilting the axes of rotation of said propellers relative to the axis of said nose portion.

2. An aircraft comprising a circular fuselage having a central opening therethrough, a central nose portion supported within the central opening and having its outer periphery spaced from the inner periphery of the central opening in said fuselage, a pair of oppositely disposed propellers carried by said nose portion and having their axes of rotation intersecting the axis of said nose portion, power driven means for independently rotating said propellers, means for rotating said nose portion about its longitudinal axis, and means for independently tilting the axes of rotation of said propellers relative to the axis of said nose portion.

3. An aircraft comprising a circular fuselage having a central opening therethrough, a central shell supported within the central opening of said fuselage and having its outer periphery spaced from the inner periphery of the central opening in said fuselage, a nose portion at the upper end of said shell having its axis rotatable about the axis of said shell, a tail portion having its axis in longitudinal alignment with the axis of said shell and projecting below said shell, radially projecting fins at the lower end of said tail portion, said tail portion and said fins being rotatable in unison with said nose portion, means for tilting said tail and fins relative to the axes of said shell and nose portion, and power means for producing a stream of air through the space between said shell and said fuselage.

4. An aircraft comprising a circular fuselage having a central opening therethrough, a central rotatable nose portion supported within the central opening of said fuselage and having its outer periphery spaced from the inner periphery of the central opening in said fuselage, and power means supported by said nose portion and having its axis movable relative to the axis of said nose portion for producing an air current through the space between said nose portion and said fuselage.

References Cited in the file of this patent

UNITED STATES PATENTS

| 2,835,458 | Dorman | May 20, 1958 |
| 2,996,269 | Parry | Aug. 15, 1961 |
| 3,002,709 | Cochran | Oct. 3, 1961 |

FOREIGN PATENTS

| 419,426 | Italy | Mar. 24, 1947 |